United States Patent [19]

Albrecht

[11] 4,064,911
[45] Dec. 27, 1977

[54] HYDRAULIC FLUID RESERVOIR FOR A CLOSED HYDRAULIC SYSTEM

[76] Inventor: David E. Albrecht, 1383 Granary Road, Blue Bell, Pa. 19422

[21] Appl. No.: 742,584

[22] Filed: Nov. 17, 1976

[51] Int. Cl.² ............................................. F16L 55/04
[52] U.S. Cl. ................................................... 138/30
[58] Field of Search .................. 220/85 B; 138/30, 26, 138/31; 174/12 R, 14 R; 92/34, 89

[56] References Cited

U.S. PATENT DOCUMENTS

| 719,104 | 1/1903 | Frey | 73/319 |
|---|---|---|---|
| 2,588,436 | 3/1952 | Violette | 174/12 R |
| 3,330,902 | 7/1967 | Nakazawa et al. | 138/30 X |
| 3,780,693 | 12/1973 | Parr | 92/34 |

FOREIGN PATENT DOCUMENTS

| 47,829 | 4/1937 | France | 220/85 B |
| 2,304,338 | 8/1974 | Germany | 174/12 R |

*Primary Examiner*—Harry N. Haroian
*Attorney, Agent, or Firm*—Smith, Harding, Earley & Follmer

[57] ABSTRACT

A vertically oriented air-tight bellows has its lower end connected to an opening in the top of the reservoir by an air-tight connection. A cover closes the upper end of the bellows and has secured thereto a fill inlet in communication with the interior of the bellows and carrying a removable cap. Vertical guide means guide the bellows in substantially vertical movement. Advantageously the bellows have means for lifting upwardly the upper end of the bellows and means for holding the bellows in an upwardly expanded position for filling. Preferably the cap for the fill inlet is transparent to permit viewing the hydraulic fluid in the bellows. A preferred embodiment has means to sight the position of the top of the bellows and a manually actuated bleed valve to vent gas from the interior of the bellows. A housing for the bellows is provided for situations where exposure to dirt particles is substantial. The capacity of an individual bellows may be varied widely and, if desired, overall capacity may be increased by employing a plurality of bellows.

12 Claims, 12 Drawing Figures

HYDRAULIC FLUID RESERVOIR FOR A CLOSED HYDRAULIC SYSTEM

BACKGROUND OF THE INVENTION

In a vented hydraulic fluid reservoir, air is allowed to pass over the surface of the hydraulic fluid. As the fluid level in the reservoir rises and falls due to factors such as system demands, fluid temperature, and evaporation, the reservoir breathes accordingly. To minimize the amount of abrasive contaminants from entering the reservoir all breathing is filtered. In such reservoir systems very small silting contaminants still get by the breather filter as do other contaminants in the form of a gas such as water vapor.

Water vapor that condenses in a reservoir froms water in the fluid. Water is one of the most dangerous contaminants to hydraulic fluids except water based hydraulic fluids. For example, its presence has a catalytic effect in the oxidation or decomposition of petroleum based hydraulic fluids. Oxidation of metal surfaces produces rust particles which when carried through the system are very detrimental.

When air or other gas is permitted to come in contact with a hydraulic fluid, it is very important that the gas does not aerate the fluid since aeration of the fluid is very detrimental to both the fluid and a pump in a high pressure system. This is due to the entrained air in the form of bubbles in the fluid being subjected to rapid changes in pressure from approximately atmospheric in the reservoir to maximum system pressure. A small air bubble in a hydraulic fluid which is rapidly compressed to 3,000 P.S.I., provides enough energy to raise the surface of the air bubble to 2,000° F as it is compressed. This high local temperature results in cracking and nitration of the hydraulic fluid and is characteristic of the "burnt" odor present in cracked petroleum. A portion of the nitrogen from the air undoubtedly forms oxides which are highly reactive and attack both the hydrocarbon oil and any additive compounds. The many millions of air bubbles in the system will eventually breakdown the complete volume of hydraulic fluid. Another result of the compressing of many millions of air bubbles is the erosion of the pump components due to implosions of the voids combined with the high localized temperatures. This explains the outlet conditions of a pump when the hydraulic fluid is aerated. All material removed from the pump by this erosion process becomes an additional contaminant to the system which must be filtered out or it will generate more contaminants as it is forced through the system resulting in the system literally eating itself.

There have been attempts to eliminate the atmosphere from coming into direct contact with the hydraulic fluid by using a diaphragm or bladder type accumulator as the entire reservoir which results in an unsatisfactory reservoir since it prevents baffling the returned fluid, is limited to relatively small fluid connections, and makes for difficult filling of the system to the desired level.

This invention uses a contamination barrier which prevents atmospheric and gaseous contaminants from being admitted to the system via the systems' reservoir. It can be added to an existing reservoir and incorporated in new reservoir designs. It provides a means to fill the system and deaerate the fluid. It provides a means to inspect the fluid to determine if atmosphere is being pulled into the system from a defective joint or seal in a negative pressure leg in the system. It provides for a visual indication of the fluid level within the system, which permits monitoring controls to be easily adapted. It adds to the pressure head in the reservoir which improves the suction conditions and life of the pump. The improved suction conditions to the pump generally results in a quieter running pump. The invention permits operation with a very low differential pressure with large reservoir connection porting permitting high flow rates with minimal pressure drop which helps prevent turbulence.

By preventing foreign material from getting into the reservoir and by starting with a clean reservoir, it is possible in most systems to eliminate the pump's suction filter and use only pressure line and/or return line filtration in the system. Removing the suction filter further improves the pump's suction condition with its many benefits. In some systems the reduction in cost by eliminating the suction filter may pay for the contamination barrier with all its other benefits.

BRIEF SUMMARY OF THE INVENTION

A vertically oriented air-tight Bellows has its lower end connected to an opening in the top of the reservoir by an air-tight connection. A cover closes the upper end of the Bellows and has secured thereto a fill inlet in communication with the interior of the Bellows and carrying a removable cap. Vertical guide means guide the Bellows in substantially vertical movement. Advantageously the Bellows have means for lifting upwardly the upper end of the bellows and means for holding the bellows in an upwardly expanded position for filling. Preferably the cap for the fill inlet is transparent to permit viewing the hydraulic fluid in the bellows. A preferred embodiment has means to sight the position of the top of the bellows and a bleed valve to vent gas from the interior of the bellows. A housing for the bellows is provided for situations where exposure to dirt particles is substantial. The capacity of an individual bellows may be varied widely and, if desired, overall capacity may be increased by employing a plurality of bellows.

DETAILED DESCRIPTION

Figure 1:
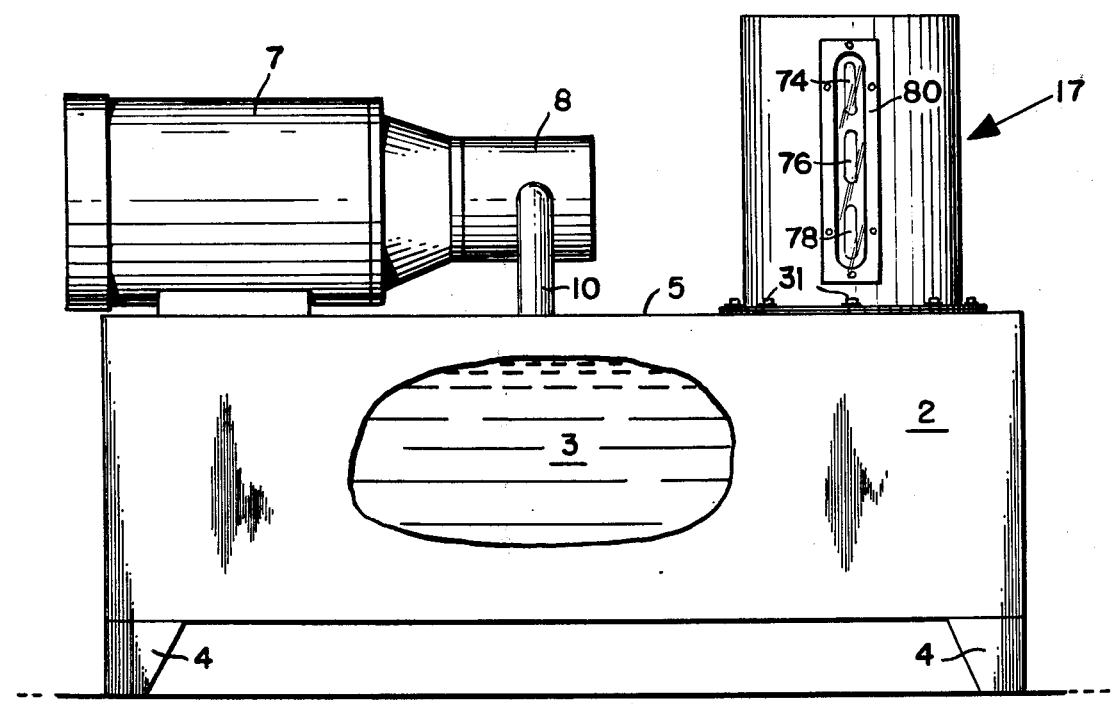
FIG. 1 is a front elevation of a hydraulic fluid reservoir and a pump of a closed hydraulic system in combination with an embodiment of the invention.

As shown in FIG. 1, a hydraulic fluid reservoir 2 for a closed hydraulic system contains a hydraulic fluid 3 and is supported by feet 4. Reservoir 2 has a flat top 5 on which is mounted an electric motor 7 connected to a pump 8 which has a suction line 10 connected to the reservoir 2 and a discharge line 12 (FIG. 2) connected to the remainder of the closed system which is not shown.

Figure 3:
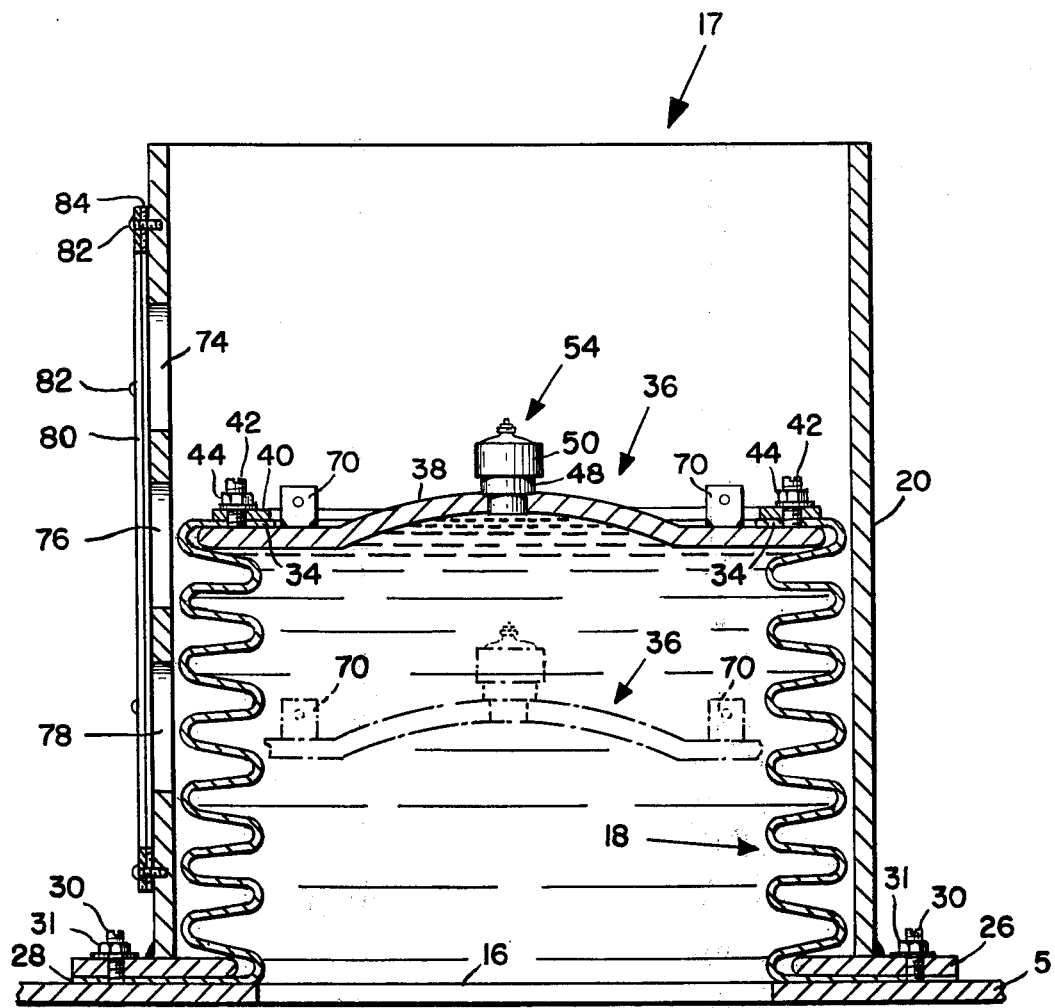
FIG. 3 is a vertical section partially broken away of the embodiment of FIG. 1.

As seen in FIG. 3, reservoir top 5 has a circular opening 16 above which is mounted a contamination barrier device 17 which has a vertically oriented air-tight bellows 18 of a flexible material compatible with the hydraulic fluid to be used. For example, a synthetic rubber such as Buna N or a synthetic resin such as polyethylene or polypropylene. Bellows 18 is surrounded by a tube 20 which acts to guide the bellows in substantially vertical movement. Tube 20 has welded thereto at its lower end a ring 26 which overlies the lower end portion 28 of bellows 18, all of which are secured to reservoir top 5 by a plurality of studs 30 welded to reservoir top 5 and nuts 31 resulting in the clamping of the lower portion 28 of bellows 18 to the reservoir top 5.

The upper end 34 of bellows 18 is secured to a dish-shaped cover 36 which has a domed central portion 38 by means of a clamping ring 40 which overlies the upper end 34 of bellows 18 and which is secured to cover 36 by a plurality of studs 42 welded to cover 36, passing through upper end 34 and ring 40 and carrying nuts 44.

Figure 4:
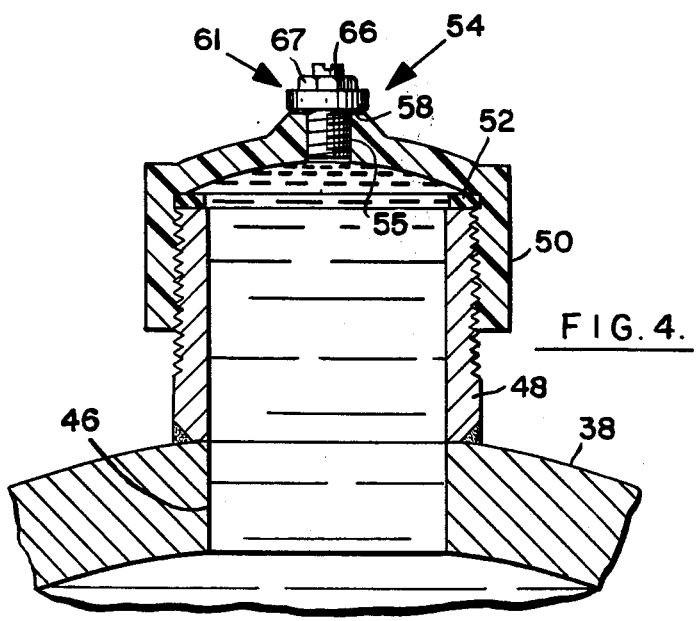
FIG. 4 is an enlarged sectional view of the capped fill inlet of the embodiment of FIG. 1.
Figure 5:
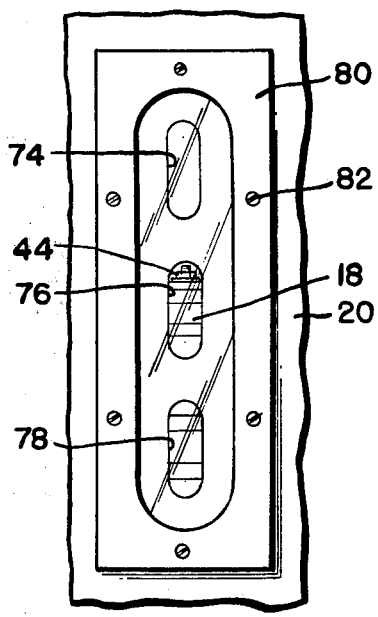
FIG. 5 is an enlarged view of the sight glass arrangement of the embodiment of FIG. 1.

Referring to FIG. 4, an opening 46 in the center of the domed portion 38 of cover 36 communicates with a fill inlet 48 which is welded to the top of the domed portion and has threaded thereto a removable and transparent or translucent cap 50 made, for example, from a plastc such as an acrylic resin, polyethylene, polypropylene or polystyrene to permit viewing the fluid. A ring gasket 52 is secured between cap 50 and inlet 48. A manually actuated bleed valve 54 in cap 50 is provided to permit the exhausting of a gas such as air.

Figure 8:
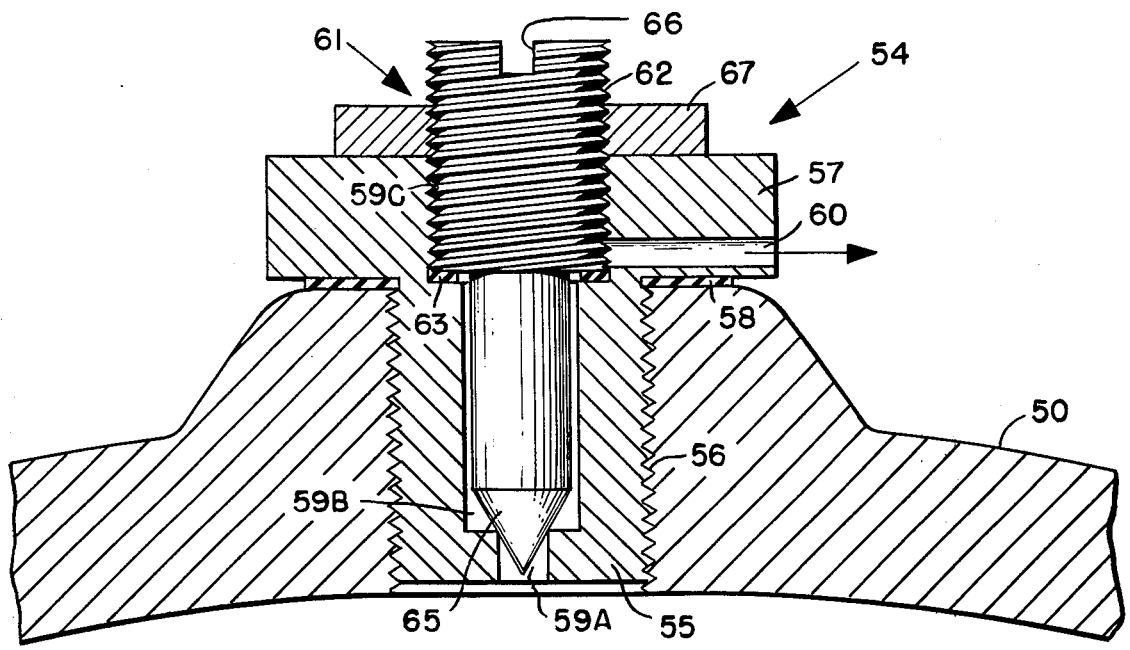
FIG. 8 is a vertical section, partially broken away, showing the bleed valve in the embodiment of FIG. 3.

Bleed valve 54 has a plug 55 threaded into cap 50 as shown at 56 (FIG. 8). Plug 55 has an enlarged head 57 which bears against a gasket 58 seated on cap 50. Plug 55 has a relatively small diameter passage 59a in communication with a larger diameter passage 59b which in turn communicates with a still larger diameter threaded portion 59c. A passage 60 in head 57 connects the portion 59c to the atmosphere. A needle 61 has a threaded head portion 62 which bears against a gasket 63 mounted in plug 55. Needle 61 has a shank portion 64 which is spaced away from plug 55 and a conical portion 65 which is adapted to seat against plug 55 where passages 59a and 59b meet. The head portion 62 has a slot 66 for the reception of a screwdriver. A locknut 67 is threaded down on headed portion 62 against head 57 of plug 55 to lock needle 61 in position. Any gas trapped within cap 50 is readily removed by unscrewing needle 61 sufficiently to permit the gas to pass between the conical portion 65 of needle 61 and plug 55 and between the head portion 62 of needle 61 and gasket 63 for passage to the atmosphere through passage 60.

A pair of pad eyes 70 (FIG. 3) are welded to the top of cover 36 to facilitate the raising of bellows 18 and securing it in the raised position.

Tube 20 has a series of vertically spaced openings 74, 76 and 78 which are covered by a sight glass 80 secured to tube 20 by screws 82, a gasket 84 being interposed between tube 20 and sight glass 80. This permits observing the position of the bellows 18 to determine if there is sufficient hydraulic fluid present and whether or not there is any leakage in the hydraulic system.

OPERATION

Figure 6:
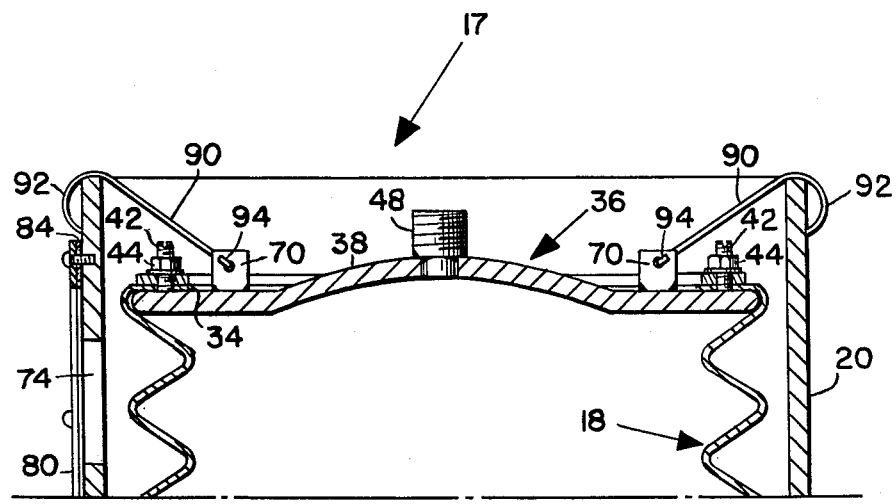
FIG. 6 is a vertical section partially broken away showing the bellows of the embodiment of FIG. 1 raised and held in the filling position and with the fill cap removed.

Before placing the hydraulic system in operation, the cap 50 is removed and hooks 90 (FIG. 6) are employed to raise the bellows 18 and cover 36. Each hook 90 has a hook end 92 adapted to engage the top of tube 20 and a hook end 94 adapted to engage a pad eye 70. With each hook 90 engaging a pad eye 70, the hooks are pulled upwardly until the hook ends 92 can hook over and engage the top of tube 20. Hydraulic fluid is then introduced through fill inlet 48 until the hydraulic fluid rises to a predetermined level, for example, to within 1 inch of the cover 36. At which time the fluid is left at rest for a few minutes to permit any entrained gases, particularly air, to come out of the hydraulic fluid. The hooks 90 are then released from tube 20 and the bellows 18 and cover 36 lowered until the fill inlet 48 is substantially filled at which point cap 50 is replaced. Vent valve 54 is then opened to permit the escape of any air or other gas remaining in the system and is then closed. Transparent cap 50 makes it possible to readily determine whether there is any air in the system at any time during operation and if any gas is observed it can be removed by vent valve 54.

The hydraulic system can now be turned on and operated. As the system demands fluid from the reservoir, the height of the bellows will lower, for example, to the position shown in full lines in FIG. 3. Further demand will result, for example, in the cover 36 being lowered to the position shown in phantom in FIG. 3. As the system puts fluid back in the reservoir, the bellows 18 and cover 36 will rise back to the position shown in full lines in FIG. 3 and still higher if all the fluid withdrawn is returned.

ALTERNATIVE EMBODIMENTS

To prevent the accumulation of abrasive dirt particles between the bellows 18 and tube 20 in very dirty environments, a cover 100 (FIG. 7) may be employed to seal off the top of tube 20. Cover 100 overlies a U-shaped gasket 102 which in turn overlies the upper end of tube 20. A flange 106 is welded about the periphery of top 100 and is secured to a flange 108 welded about the periphery of tube 20 by screws shown at 110 to clamp top 100 tightly down against gasket 102. A breather filter 112 containing filter material 114 is attached to the top 100 to permit filtered air to enter inside tube 20 and air inside tube 20 to pass outside to the atmosphere as the bellows 18 moves downwardly and upwardly respectively.

Figure 2:
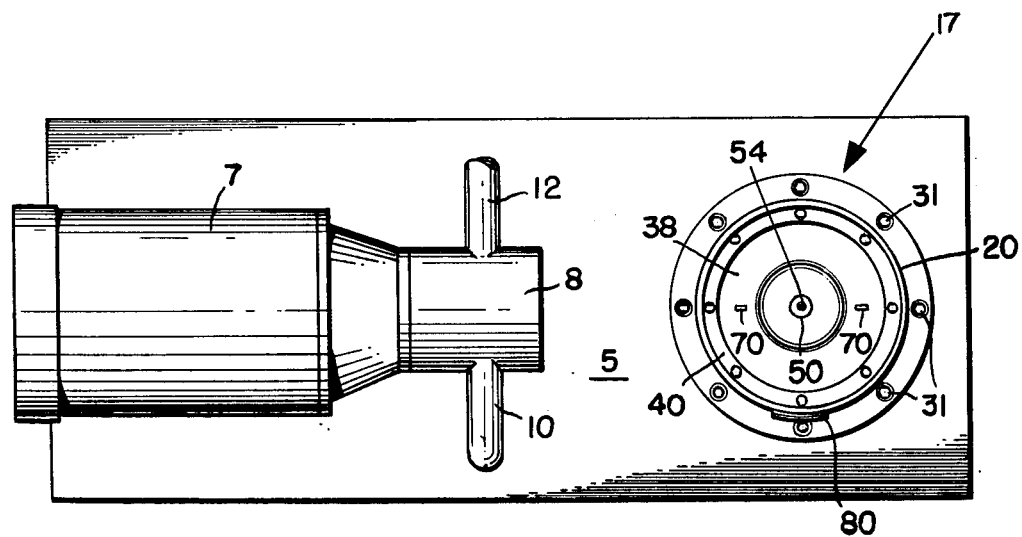
FIG. 2 is a top plan view of the structure of FIG. 1.
Figure 7:
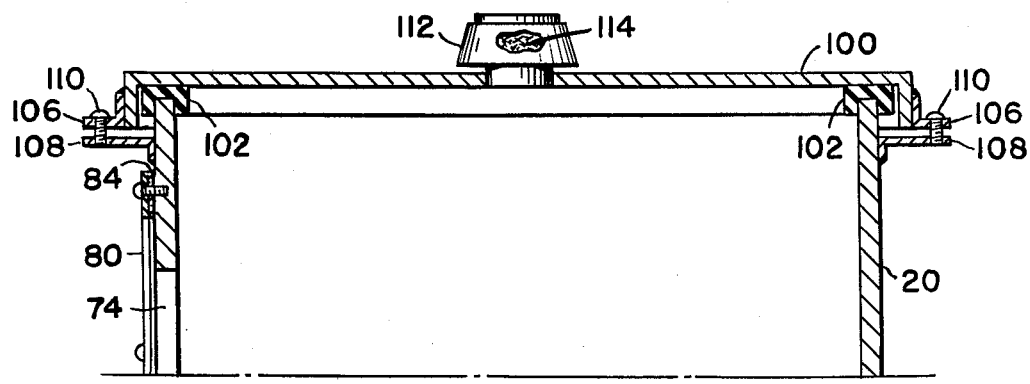
FIG. 7 is a vertical section, partially broken away, of the embodiment of FIG. 3 with a cover added.
Figure 9:
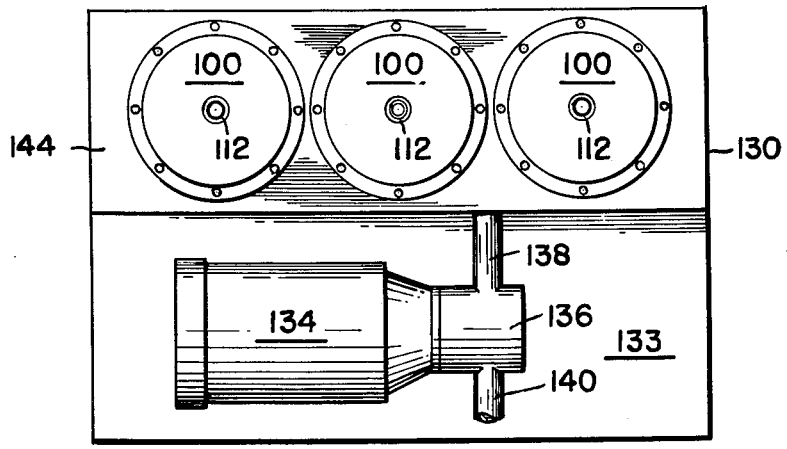
FIG. 9 is a plan view of the alternative embodiment.
Figure 10:
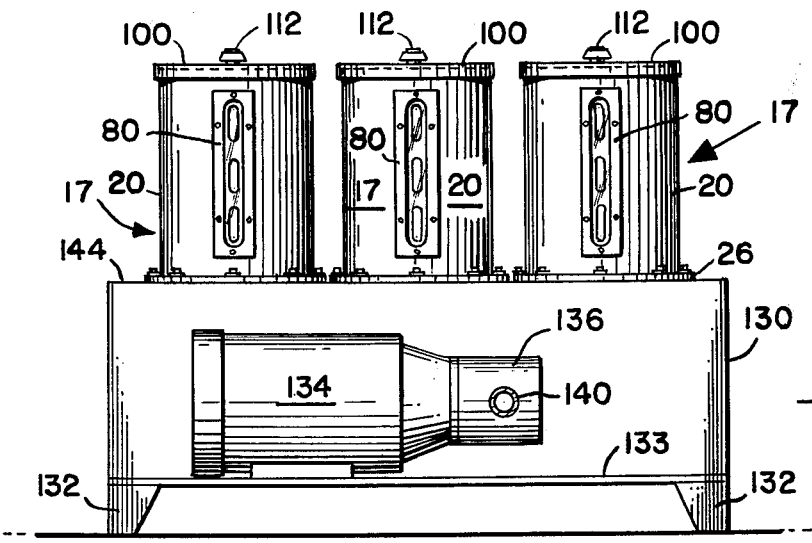
FIG. 10 is a front elevation of the embodiment of FIG. 9.

As shown in FIGS. 9 and 10 a hydraulic fluid reservoir 130 for a closed hydraulic system is supported by feet 132 and incorporates a platform 133 on which is mounted an electric motor 134 connected to a pump 136 having a suction line 138 connected to reservoir 130 and a discharge line 140. Three contamination barrier devices 17 are mounted on top 144 of reservoir 130. Each barrier device 17 is secured to reservoir 130 in the same manner as the barrier device 17 shown in FIGS. 1 through 3 is secured to reservoir 2. And hence no further details need be given here. In this case the capacity of the barrier device is tripled without the necessity for increasing the size of the bellows. As shown in FIGS. 9 and 10 each barrier device 17 is provided with a cover 100 which is installed in the manner as shown in FIG. 7.

Figure 11:
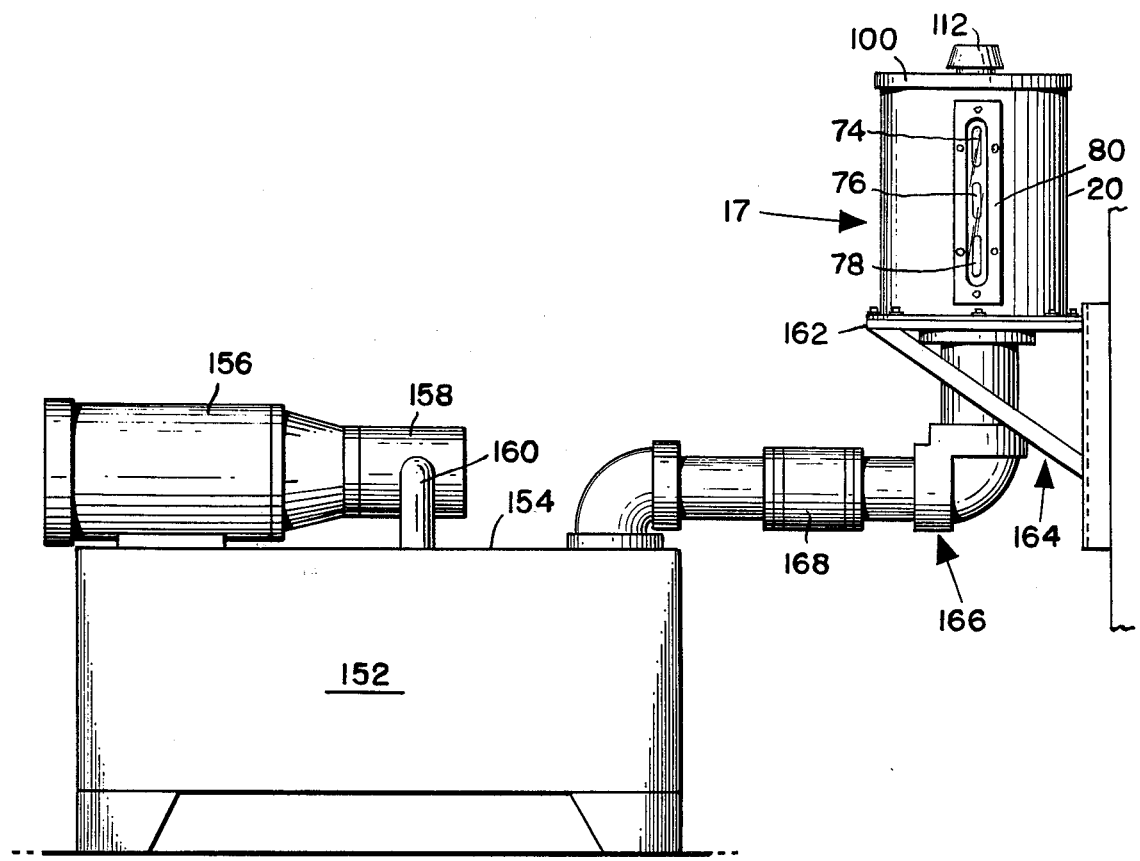
FIG. 11 is a front elevation of an alternative embodiment.

As shown in FIG. 11, a barrier device 17 may be combined with a hydraulic fluid reservoir 152 with the barrier device 17 mounted above the reservoir 152 at a remote location. Reservoir 152 has a top 154 on which is mounted an electric motor 156 connected to a pump 158 which has a suction line 160 connected to reservoir 152 and a discharge line (not shown). A barrier device 17 having a cover 100 is mounted on a ring 162 supported on a mounting bracket 164. A conduit 166 connected to the bottom of ring 162 has an expansion joint 168 and connects the barrier device 17 to the top of reservoir 152.

Figure 12:
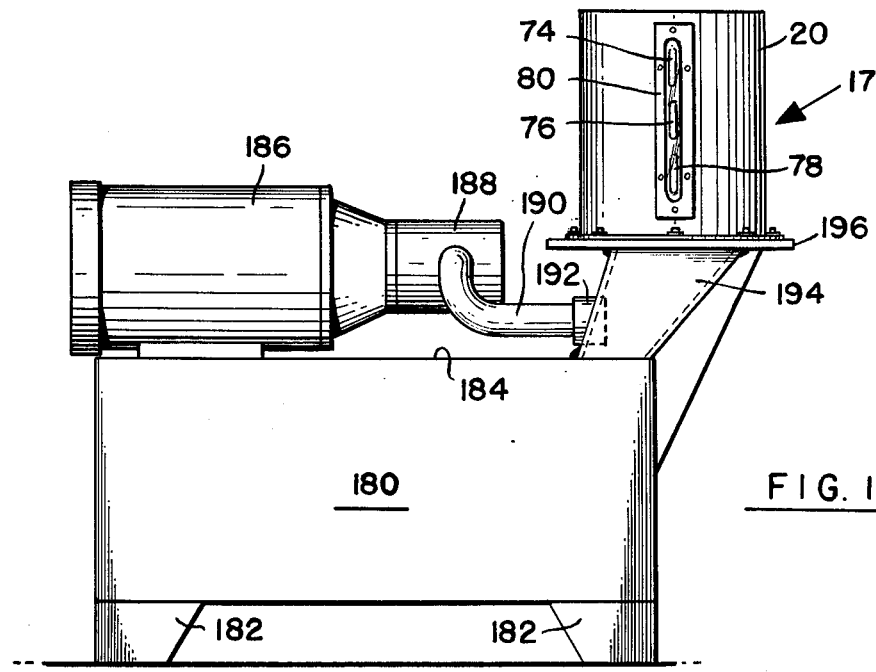
FIG. 12 is a front elevation of an alternative embodiment.

An alternative mounting for a barrier device 17 is shown in FIG. 12. Here a reservoir 180 mounted on feet 182 has a top 184 on which is mounted an electric motor 186 connected to a pump 188 having a suction line 190 and a discharge line (not shown). Suction line 190 is connected by a fitting shown at 192 to a conduit 194 which is rectangular in horizontal cross-section, has its lower end discharging into reservoir 180 and its upper end welded to a ring 196 to communicate with a barrier device 17 mounted on the top of ring 196. In this embodiment, not only is the barrier device 17 mounted away from the reservoir, but also the pump 188 is advantaged by having its suction line 190 connected to conduit 194 since it eliminates an additional hole being made in the reservoir top.

It will be understood that the above described embodiments are illustrative and not intended to be limiting.

I claim:

1. In combination with a hydraulic fluid reservoir for a closed hydraulic system including a pump the improvement comprising:
    a substantially vertically oriented air-tight bellows of substantially uniform cross-section and having open upper and lower ends,
    air-tight means including an opening in the top of the reservoir to secure the bellows above the reservoir with substantially the entire cross-section of its lower end in communication with the top of the reservoir,
    a cover closing off the upper end of the bellows,
    a fill inlet secured to the cover and communicating with the interior of the bellows for filling the reservoir and bellows with hydraulic fluid,
    a removable cap for the fill inlet,
    substantially vertical guide means to guide the bellows in substantially vertical movement, and
    mechanical locking means for holding the bellows in an upwardly expanded position for filling and degassing the hydraulic fluid.

2. The combination of claim 1 having means for lifting upwardly the upper end of the bellows.

3. The combination of claim 1 in which the cap for the fill inlet is transparent to permit viewing the hydraulic fluid in the bellows.

4. The combination of claim 1 in which the cap for the fill inlet has a bleed valve to vent air from the interior of the bellows.

5. The combination of claim 1 having means to sight the elevation of the bellows.

6. The combination of claim 1 in which the bellows is housed in an air-tight casing having a breather cap containing a filter for dirt particles.

7. The combination of claim 1 in which the bellows is mounted on the top of the reservoir.

8. The combination of claim 1 in which the bellows is mounted at a position removed from the reservoir.

9. The combination of claim 8 in which the air-tight means has a conduit connecting the bellows and the reservoir and a suction line connects said conduit to the pump in the hydraulic system.

10. In combination with a hydraulic fluid reservoir for a closed hydraulic system including a pump the improvement comprising:
    a substantially vertically oriented air-tight bellows of substantially uniform cross-section and having open upper and lower ends.
    air-tight means including an opening in the top of the reservoir to secure the bellows above the reservoir with substantially the entire cross-section of its lower end in communication with the top of the reservoir,
    a cover closing off the upper end of the bellows,
    a bleed valve communicating with the interior of the bellows to vent air from the interior of the bellows,
    substantially vertical guide means to guide the bellows in substantially vertical movement, and
    mechanical locking means for holding the bellows in an upwardly expanded position for filling.

11. The combination of claim 10 having means for lifting upwardly the upper end of the bellows.

12. The combination of claim 10 having means to sight the elevation of the bellows.

* * * * *